United States Patent
Watanabe et al.

(10) Patent No.: US 7,136,596 B2
(45) Date of Patent: Nov. 14, 2006

(54) OPTICAL PULSE ADDITION DEVICE

(75) Inventors: Shigeki Watanabe, Kawasaki (JP); Fumio Futami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 692 days.

(21) Appl. No.: 10/014,367

(22) Filed: Dec. 14, 2001

(65) Prior Publication Data
US 2002/0196498 A1    Dec. 26, 2002

(30) Foreign Application Priority Data
May 31, 2001    (JP) .............................. 2001-163828

(51) Int. Cl.
*H04J 14/08* (2006.01)
(52) U.S. Cl. ........................... 398/199; 398/75; 398/98
(58) Field of Classification Search .................. 398/98, 398/99, 180, 199; 372/99; 385/124, 125
See application file for complete search history.

(56) References Cited

U.S. PATENT DOCUMENTS

| | | | |
|---|---|---|---|
| 5,457,559 A * | 10/1995 | Saito et al. .................... | 398/98 |
| 5,519,723 A * | 5/1996 | MacDonald .................. | 372/99 |
| 5,579,428 A * | 11/1996 | Evans et al. ................. | 385/124 |
| 6,141,129 A * | 10/2000 | Mamyshev .................. | 398/180 |
| 6,307,984 B1 | 10/2001 | Watanabe | |
| 6,424,773 B1 | 7/2002 | Watanabe | |
| 6,453,082 B1 | 9/2002 | Watanabe | |
| 6,477,300 B1 | 11/2002 | Watanabe et al. | |
| 6,587,242 B1 * | 7/2003 | Shake et al. .................. | 398/98 |
| 6,792,188 B1 * | 9/2004 | Libori et al. ................. | 385/125 |

FOREIGN PATENT DOCUMENTS

| | | |
|---|---|---|
| EP | 0 771 091 A2 | 5/1997 |
| EP | 0 892 516 A2 | 1/1999 |
| EP | 0 938 197 A2 | 8/1999 |
| JP | WO98/08138 | 2/1998 |
| JP | 98-00737 | 6/1998 |
| JP | 99-01050 | 5/1999 |
| JP | 99-01994 | 5/1999 |
| JP | 99-02335 | 8/1999 |
| JP | 99-02665 | 10/1999 |
| JP | 00-00789 | 9/2000 |
| WO | WO 00/72067 A1 | 11/2000 |

OTHER PUBLICATIONS

Communication from the European Patent Office dated Sep. 19, 2002.

T. Morioka, et al., Multiple-output, 100 Gbit/s all-optical demultiplexer based on multichannel four-wave mixing pumped by a linearly-chirped square pulse; Electronics Letters, Nov. 10th, 1994, vol. 30, No. 23, pp. 1959-1960.

(Continued)

*Primary Examiner*—David C. Payne
(74) *Attorney, Agent, or Firm*—Staas & Halsey LLP

(57) ABSTRACT

SC light is generated from the input signal 2, of an OTDM signal light 1 with wavelength $\lambda_{s1}$ and an input signal 2 with wavelength $\lambda_{s2}$ using an optical fiber and the like, and the wavelength of the SC light is converted into wavelength $\lambda_{s1}$ using a BPF with center wavelength $\lambda_{s1}$ (a specific-timing optical pulse with wavelength $\lambda_{s1}$ is extracted from the SC light). After the addition timing of the wavelength-converted light is adjusted by a delayer ($\tau$) both this wavelength-converted light and signal light 1 are inputted to an optical add circuit and are added.

14 Claims, 5 Drawing Sheets

OTHER PUBLICATIONS

Kentaro Uchiyama, et al., 100-Gb/s Multiple-Channel output All-Optical OTDM Demultiplexing Using Multichannel Four-Wave Mixing in a Semiconductor Optical Amplifier, IEEE Photonics Technology Letters, vol. 10, No. 6, Jun. 1, 1998, pp. 890-892.

K. Uchiyama et al., Multiple-channel output all-optical OTDM demultiplexer using XPM-included chirp compensation of (MOXIC), Electronics Letters, Mar. 19, 1998, vol. 34, No. 6.

S. Watanabe, et al, "All-Optical Signal Processing Using Highly-Nonlinear Optical Fibers", IEICE Transactions on Communications, A Publication of the Communications Society, vol. E84-B, No. 5, May 2001.

U.S. Appl. No. 09/560,723, filed Apr. 28, 2000, Shigeki Watanabe.
U.S. Appl. No. 09/571,384, filed May 15, 2000, Shigeki Watanabe.
U.S. Appl. No. 09/637,640, filed Aug. 14, 2000, Shigeki Watanabe.
U.S. Appl. No. 09/774,686, filed Feb. 1, 2001, Akira Karasudani.
U.S. Appl. No. 09/803,978, filed Mar. 13, 2001, Shinichi Takeda et al.
U.S. Appl. No. 09/814,762, filed Mar. 23, 2001, Shigeki Watanabe et al.

* cited by examiner

OPTICAL PULSE ADDITION DEVICE

CROSS REFERENCE

This application is related to the U.S. patent applications Ser. No., 09/803,978, 09/783,557, and 09/774,686, which are herein incorporated by reference.

BACKGROUND OF THE INVENTION

1. Field of the Invention

The present invention relates to a device for processing optical signals without converting the optical signals into electrical signals, and in particular, it relates to the improvement of both the flexibility of an optical communications system and the system flexibility at each type of node point of an optical network.

2. Description of the Related Art

To enable high-speed large-capacity communications, at present an optical communications system is being developed and a part of the development is commercialized. Since such an optical communications system handles signals with a bit rate of 10 GHz and more, signals must be processed at speeds corresponding to these bit rates. However, if optical signals are converted into electrical signals, electronic devices cannot operate at a high speed such that optical signals can be handled, which is an obstacle to the implementation of the high-speed large-capacity optical communications described above. Therefore, to implement such high-speed large-capacity optical communications, fully optical devices for processing optical signals without converting the signals into electrical signals must be developed.

For a conventional method for branching/adding optical signals in order to implement the high-speed large-capacity optical communications, a method for processing wavelength-division-multiplexing (WDM) signals in a wavelength domain is generally used. When an optical signal control technology further progresses and each WDM signal channel is composed of high-speed large-capacity signals by optical time-division multiplexing (OTDM), the branching/addition of signals on a time axis will also be needed in the future.

However, the addition/branching of optical signals in OTDM described above requires a very high speed processing. Therefore, if optical signals are branched/added after being converted into electrical signals, the advantage of using optical signals in a sufficiently high-speed and large capacity communications cannot be utilized since the operation of electrical devices are slow.

Therefore, a configuration for enabling the branching/ addition of high-speed OTDM signals without converting the signals into electrical signals is needed in the future.

SUMMARY OF THE INVENTION

It is an object of the present invention to provide a wavelength conversion/optical pulse addition device for implementing the addition of an OTDM signal by ultra high-speed wavelength conversion using both a short pulse and a chirp by a third order non-linear medium and enabling access for each channel, which will be a problem when each WDM signal channel in an optical network is handled at a very high speed and in a very large capacity in the future.

The optical pulse addition device of the present invention demultiplexes/multiplexes time-division multiplexed optical signals in terms of time without converting the signals into electrical signals. The optical pulse addition device comprises a chirp unit generating a frequency chirp in an inputted optical signal composed of optical pulses and extending the spectrum of the optical pulse, a transmission unit transmitting a part of the extended spectrum through a band around a prescribed wavelength, and an addition unit adding an optical pulse corresponding to the transmitted band to a time-division multiplexed optical signal with the prescribed wavelength.

According to the present invention, since time-division multiplexed optical signals can be time-multiplexed/time-demultiplexed without being converted into electrical signals, a circuit configuration can be simplified and simultaneously a high-speed operation can be implemented. Therefore, the present invention will greatly contribute to the implementation of a time-division multiplex/demultiplex apparatus in a high-speed optical communications in the future.

DESCRIPTION OF THE PREFERRED EMBODIMENTS

Figure 1:
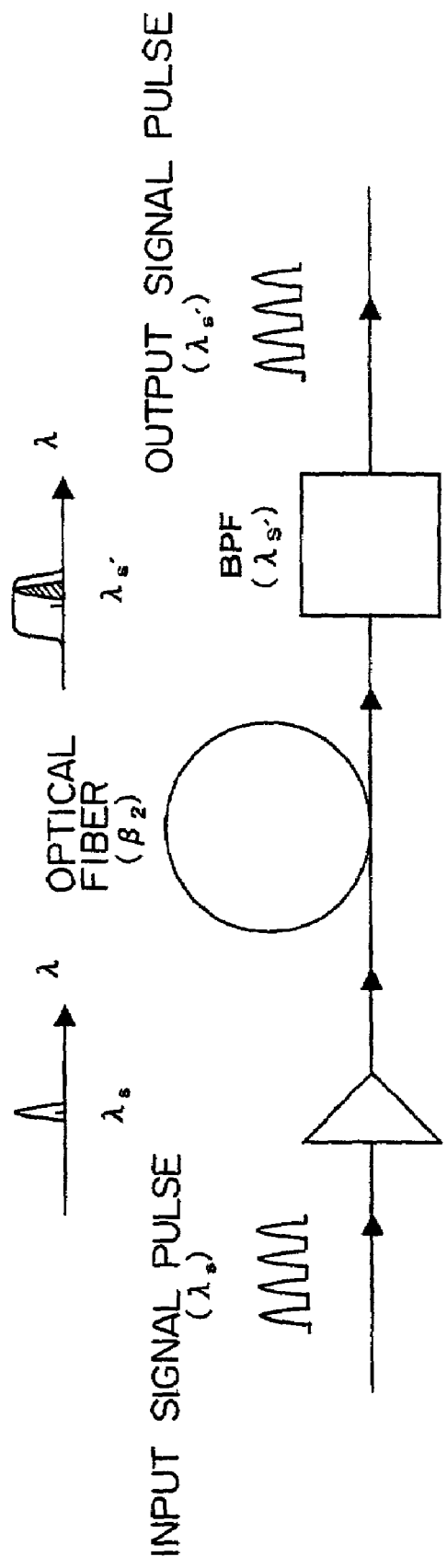
FIG. 1 shows the basic configuration of the preferred embodiment of the present invention.

In the preferred embodiment of the present invention, light addition on an optical time axis is implemented by extracting the same wavelength component as a second OTDM signal light using an optical band pass filter and combining this extracted OTDM signal light with the second OTDM signal light while timing-synchronizing after inputting a first OTDM signal light to a third order non-linear medium and chirping the signal light.

The principle is described below.

A case where an optical pulse U (z,T) with a width $T_o$ and a peak power $P_o$ propagates through an optical fiber is studied. The present invention assumes that an RZ signal is used for an optical pulse. T and z are a time passing in a coordinate system as an optical pulse moves and the length of the optical fiber covered by the optical pulse, respectively.

If the chromatic dispersion $\beta_2$ of this optical fiber is not so large and if dispersion length $L_D = T_o^2/|\beta_2|$ is sufficiently longer than a non-linear length against optical pulse $L_{NL} = 1/\gamma P_o$ ($\gamma$ is a third order non-linear constant) ($L_D \gg L_{NL}$), the phase shift by SPM can be expressed as follows.

$$\phi_{NL}(z, T) = |U(0, T)|^2 \frac{z_{\mathit{eff}}}{L_{NL}} \quad (1)$$

In the above equation, $Z_{eff}=[1-\exp(-\alpha z)/\alpha]$ is an effective (non-linear) interaction length. In this case, chirp $\delta\omega$ is calculated as follows.

$$\delta\omega_{NL} = -\frac{\partial \phi_{NL}}{\partial T} = -\frac{\partial |U(0,T)|^2}{\partial T} \frac{z_{eff}}{L_{NL}} \quad (2)$$

Since $|U(0,T)|^2$ corresponds to peak power (power included in one pulse), according to equation (2), the steeper the slope of the power, the larger the chirping in each part of an optical pulse. The longer propagation distance z and the shorter non-linear length $L_{NL}$ (the larger $\gamma P_o$), the larger the chirping. Thus, chirping by SPM gives frequency components to an optical pulse and, as a result, the spectrum of the optical pulse is extended.

If an optical pulse is inputted to a third order non-linear medium with high peak power, a chirp by SPM is generated and the spectrum is extended. In particular, in the case of a short pulse with high peak power, the chirp is very large, and an optical pulse becomes a broadband spectrum light that is a so-called supercontinuum (SC). Since the response time of a third order non-linear effect in an optical fiber is in units of femto seconds, each spectrum factor of SC light can be considered to be almost completely synchronized with the original input signal pulse taking into account the fact that the bit rate of optical signals are in units of ps to ns. Therefore, if a part of SC light is extracted using a band pass filter, a pulse synchronized with the input signal pulse can be extracted. This indicates that a pulse synchronized with an input signal pulse with an arbitrary wavelength can be generated. Specifically, if the spectrum of a received optical signal is observed on the receiving side of the optical signal, the spectrum is narrow in width when there is no optical pulse. However, when there is an optical pulse, it is observed that the spectrum is suddenly extended. Thus, the spectrum is extended/narrowed in synchronization with the arrival of an optical pulse.

A method for performing the full-light 2R reproduction of signal light using this SC is disclosed in Japanese Patent Application Nos. 2000-34454 and 2000-264757.

In order to effectively generate a chirp by SPM, it is effective (1) to use a dispersion flat (optical) fiber (DFF) (fiber in which the zero dispersion wavelength of an optical fiber is shifted and a part of the fiber having an almost flat dispersion characteristic is used as a transmission band) or (2) to increase the $\gamma$ value of an optical fiber. A DDF can be implemented by performing control of a core diameter or the specific refractive index difference $\Delta$ between a core and a clading.

The $\gamma$ of an optical fiber can be expressed as follows.

$$\gamma = \frac{\omega n_2}{cA_{eff}} \quad (3)$$

In the above equation, $\omega$, c, $n_2$ and $A_{eff}$ are a light angular frequency, the speed of light in a vacuum, the non-linear refractive index of a fiber and an effective core cross-sectional area, respectively. In order to generate a short but sufficiently large chirp, it is effective to increase $n_2$ in equation (3) or to increase the intensity of light by reducing a mode field diameter (MFD), that is, $A_{eff}$. As means for increasing $n_2$, there is a method for doping fluorine to a cladding and doping a large amount of $GeO_2$. In case the doping density of $GeO_2$ is 25 to 30 mol %, a large $n_2$ value of $5\times10^{20}$ m$^2$/W or more has been obtained (in the case of a normal silica fiber, $n_2$ is $3.2\times10^{20}$ m$^2$/W or more). The MFD can be reduced by the specific refractive index difference $\Delta$ between a core and a clading, by the optimal design of a core shape or by using a fiber with photonic crystal structure (holey fiber). If the specific refractive index difference $\Delta 2.5$ to 3% in the $GeO_2$-doped fiber described above, an MDF of approximately 4 µm or more has been obtained. As the total effect of these effects, a fiber with a large $\gamma$ value of 15 to 20 W$^{-1}$km$^{-1}$ or more has been obtained. The optical fiber is, for example, a single-mode fiber.

In order to make the dispersion length sufficiently longer than the non-linear length or to compensate for a chirp, it is preferable to be able to arbitrarily adjust the group velocity dispersion (GVD) of such a fiber. This objective is also possible by setting the parameters as follows. First, if in a normal DCF, a specific refractive index difference $\Delta$ is increased in a constant MFD, a dispersion value increases in a normal dispersion area. However, if a core diameter is increased, dispersion decreases. If a core diameter is reduced, dispersion increases. Therefore, if a core diameter is increased in a state where an MFD is set to a specific value in the wavelength band of excitation light, dispersion can be reduced to zero. Conversely, a desired normal dispersion fiber can also be obtained.

A highly non-linear dispersion shift fiber (HNL-DSF) or a DCF, in which $\gamma$=15 to 20 W$^{-1}$km$^{-1}$, or more, has been implemented by such a method.

The high-accuracy management method of both a zero-dispersion wavelength and GVD in an HNL-DSF is disclosed in Japanese patent Application No.10-507824.

FIG. 1 shows the basic configuration of the preferred embodiment of the present invention.

After a signal pulse with center wavelength $\lambda_s$ is amplified to a power sufficient to generate a desired chirp, it (a signal pulse) is inputted to an optical fiber with GVD $\beta_2$ and a chirp by SPM is generated. The chirped pulse is passed through a BPF with center wavelength $\lambda_s$, different from center wavelength $\lambda_s$. In this case, both the transmission bandwidth and shape of the BPF is appropriately set in advance so as to match a desired pulse width and a desired pulse shape, respectively. Basically, the shape is set in advance to the close equivalent of the spectrum shape of an input signal pulse. If spectrum extension by a chirp is sufficiently large, center wavelength $\lambda_s$, can be extracted as signal light obtained by converting signal wavelength $\lambda_s$ into an arbitrary wavelength in an extended spectrum band.

Figure 2:
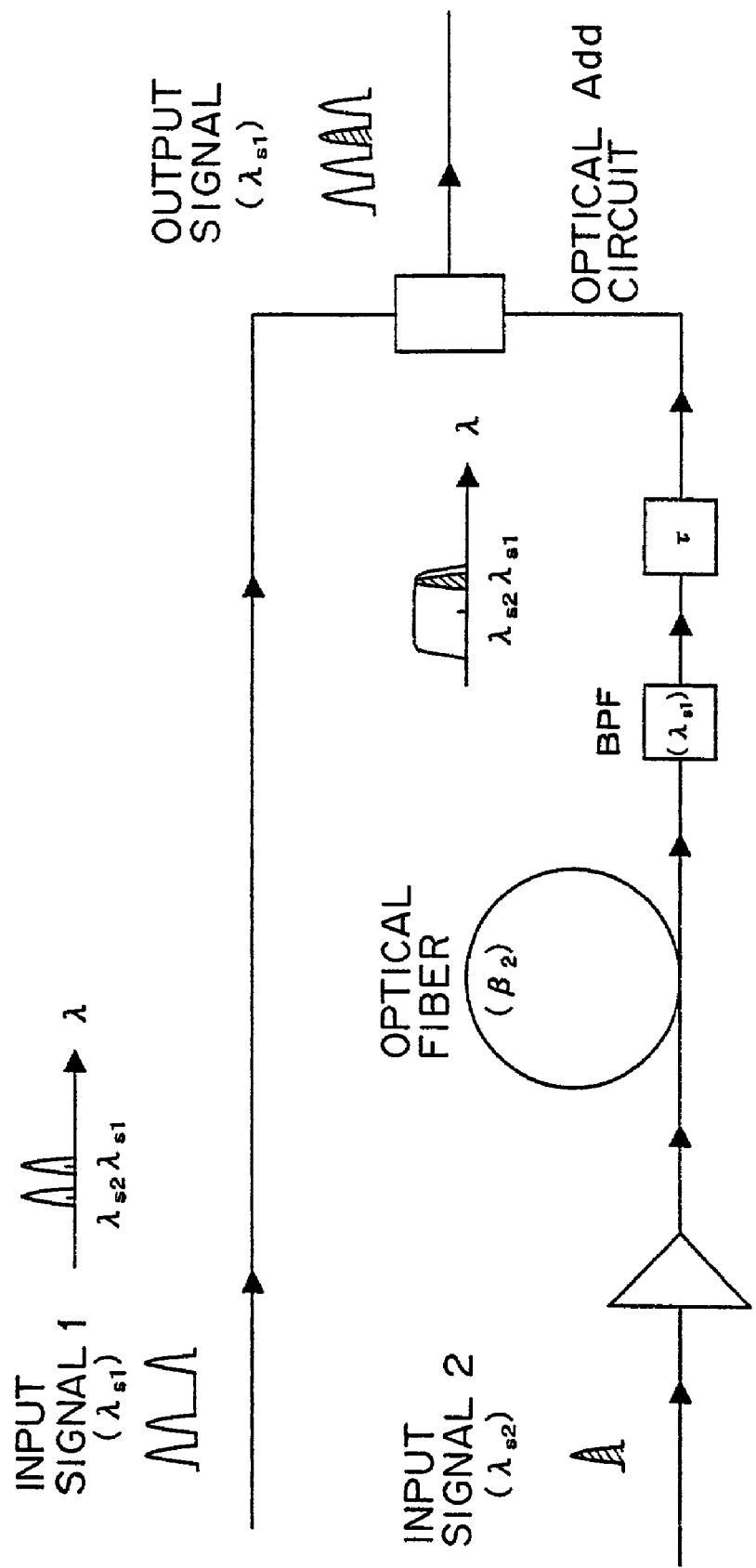
FIG. 2 shows the configuration of the first preferred embodiment of the present invention.

FIG. 2 shows the configuration of the first preferred embodiment of the present invention.

OTDM signal light 1 with wavelength $\lambda_{s1}$ and an input signal 2 with wavelength $\lambda_{s2}$ are taken. As shown in FIG. 2, SC light is generated from the input signal 2 using an optical fiber, and the wavelength of the SC light is converted into wavelength $\lambda_{s1}$ using the center wavelength $\lambda_{s1}$ of a BPF (a specific-timing optical pulse with wavelength $\lambda_{s1}$ and which is extracted from the SC light). After the addition timing of the wavelength-converted light is adjusted by a delayer ($\tau$), both this wavelength-converted light and signal light 1 are inputted to an optical add circuit and are added. In this case, it is allowable if both the wavelength-converted light and signal light 1 are prevented from overlapping each other by adjusting the timing of either the wavelength-converted light or signal light 1 instead of adjusting the timing of the wavelength-converted light. Thus, the light addition in terms of time of a WDM signal can be implemented.

After an arbitrary channel is dropped from OTDM signal light 2 using an optical drop circuit and the wavelength of this drop signal is converted into the same wavelength as the first OTDM signal light by this preferred embodiment, both the drop signal and input light 1 are inputted to an optical add circuit and are added. In this case, for the optical drop circuit, all circuits used for the optical demultiplexing of an OTDM signal can be used. For example, a LiNbO$_3$ modulator, an EA modulator, an MZ interferometer type optical-switch, a four wave mixer, a three-wave mixer or a difference-frequency generator and the like are used.

Figure 3:
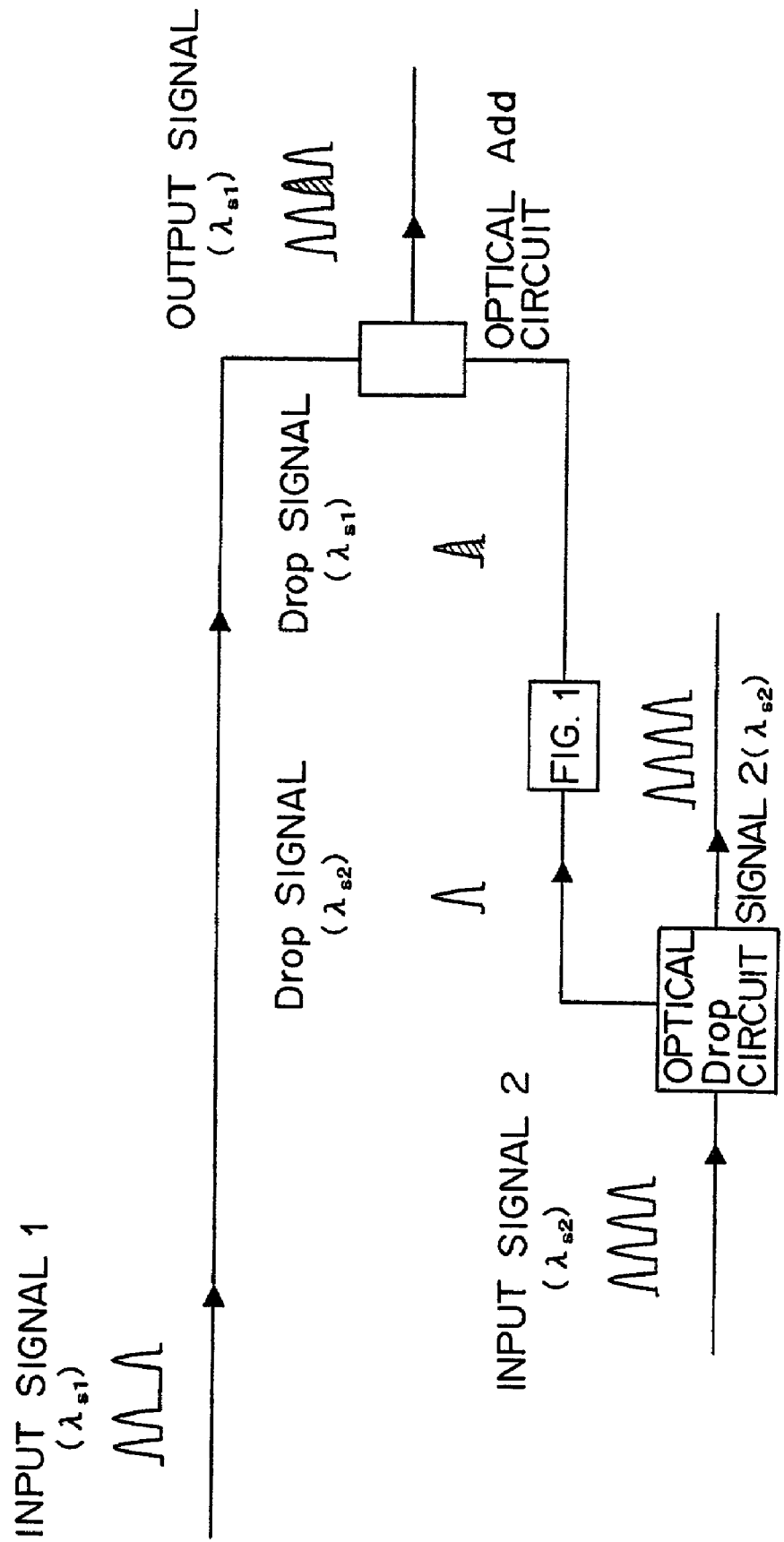
FIG. 3 shows the configuration of the second preferred embodiment of the present invention.

FIG. 3 shows the configuration of the second preferred embodiment of the present invention.

In the example shown in FIG. 3, a four wave mixer or the like is used for the optical drop circuit. In this case, even if a specific channel is dropped, the original input signal 2 is outputted without any conversion.

Input signal 1 does not include a specific-timing optical impulse with wavelength $\lambda_{s1}$. Input signal 2 includes an optical pulse with wavelength $\lambda_{s2}$ to be added to the input signal light 2. The optical drop circuit drops an optical signal of wavelength $\lambda_{s2}$ from the input signal 2 and the drop signal is inputted to the configuration shown in FIG. 1, which is the basic configuration of the present invention. Then, this configuration shown in FIG. 1 generates SC light from the light with wavelength $\lambda_{s2}$, and an optical pulse with wavelength $\lambda_{s1}$ inputted at a specific timing is extracted from this SC light, and as a result, a signal with converted wavelength $\lambda_{s1}$ is outputted. Then, this wavelength-converted optical pulse is added to the input signal 1 in an optical add circuit and is outputted.

Figure 4:
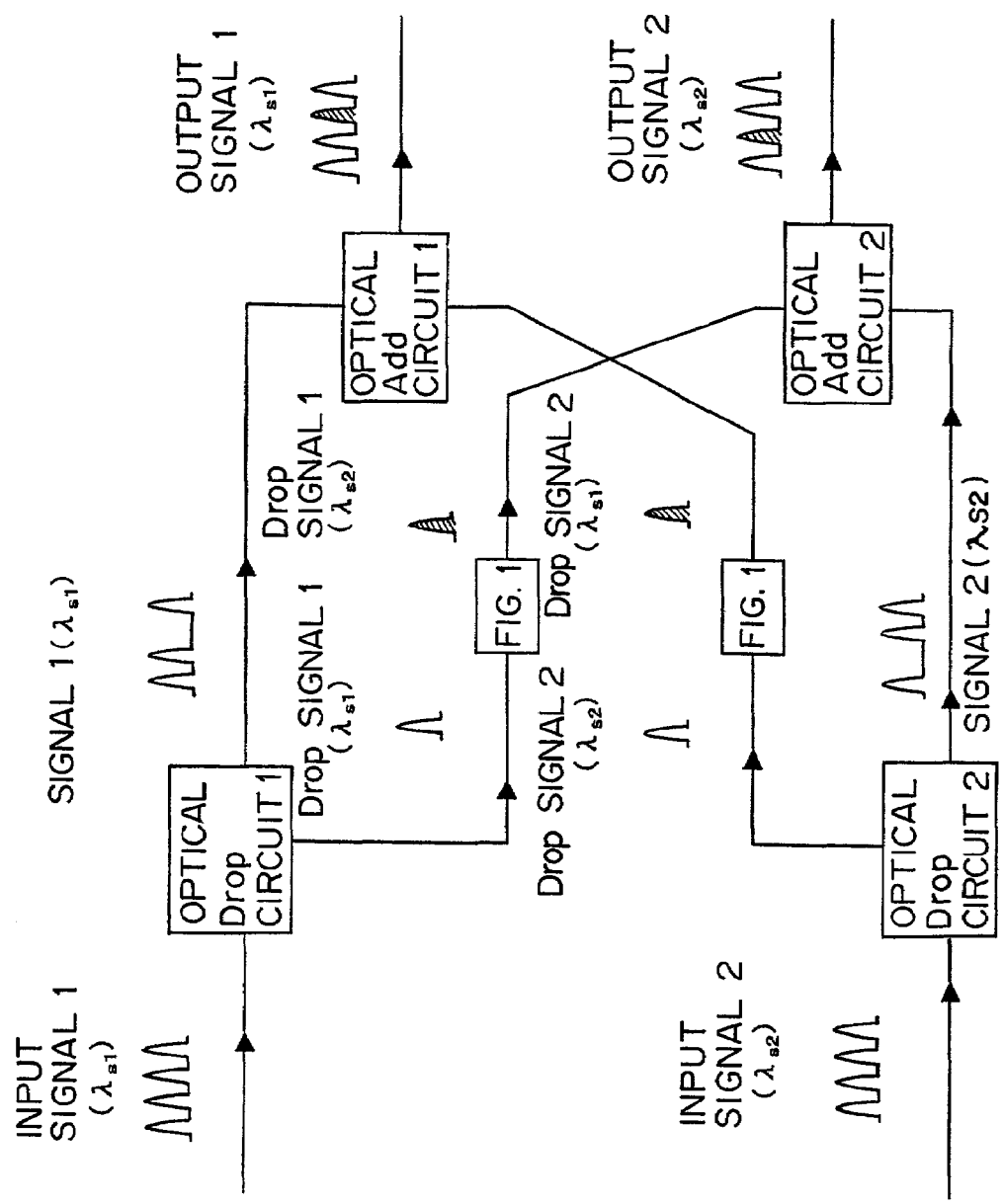
FIG. 4 shows the configuration of the third preferred embodiment of the present invention.

FIG. 4 shows the configuration of the third preferred embodiment of the present invention.

In this case, a Mach-Zehnder (MZ) interferometer type optical-switch or the like is used for an optical drop circuit. Therefore, there is space in the dropped channel. In this preferred embodiment, a channel branched from a channel OTDM signal with another wavelength is inserted into this space.

In FIG. 4, the optical pulse with wavelength $\lambda_{s1}$ of input signal 1 and the optical pulse with wavelength $\lambda_{s2}$ of input signal 2 are branched/added to the input signals 2 and 1, respectively. Input signal 1 has wavelength $\lambda_{s1}$ and an optical drop circuit 1 branches an optical pulse with a specific timing. Signal 1 having passed through the optical drop circuit 1 no longer has an optical pulse with a specific timing. Similarly, input signal 2 has wavelength $\lambda_{s2}$ and an optical drop circuit 2 branches an optical pulse with a specific timing. Signal 2 having passed through the optical drop circuit 2 no longer has an optical pulse with a specific timing.

Then, the wavelength of drop signal 1 is converted into wavelength $\lambda_{s2}$ by the basic configuration of the present invention shown in FIG. 1 and is inputted to the optical add circuit 2. Similarly, the wavelength of drop signal 2 is converted into wavelength $\lambda_{s1}$ by the basic configuration of the present invention shown in FIG. 1 and is inputted to the optical add circuit 1.

Then, in the optical add circuit 1, drop signal 2 is added to the part from which the optical pulse of signal 1 is extracted, and in the optical add circuit 2, drop signal 1 is added to the part from which the optical pulse of signal 2 is extracted Thus, although conventionally signals are added/dropped in the units of wavelength, by adopting this preferred embodiment, an optical pulse with a specific timing can be added/dropped without being converted into electrical signals even in the same wavelength.

Figure 5:
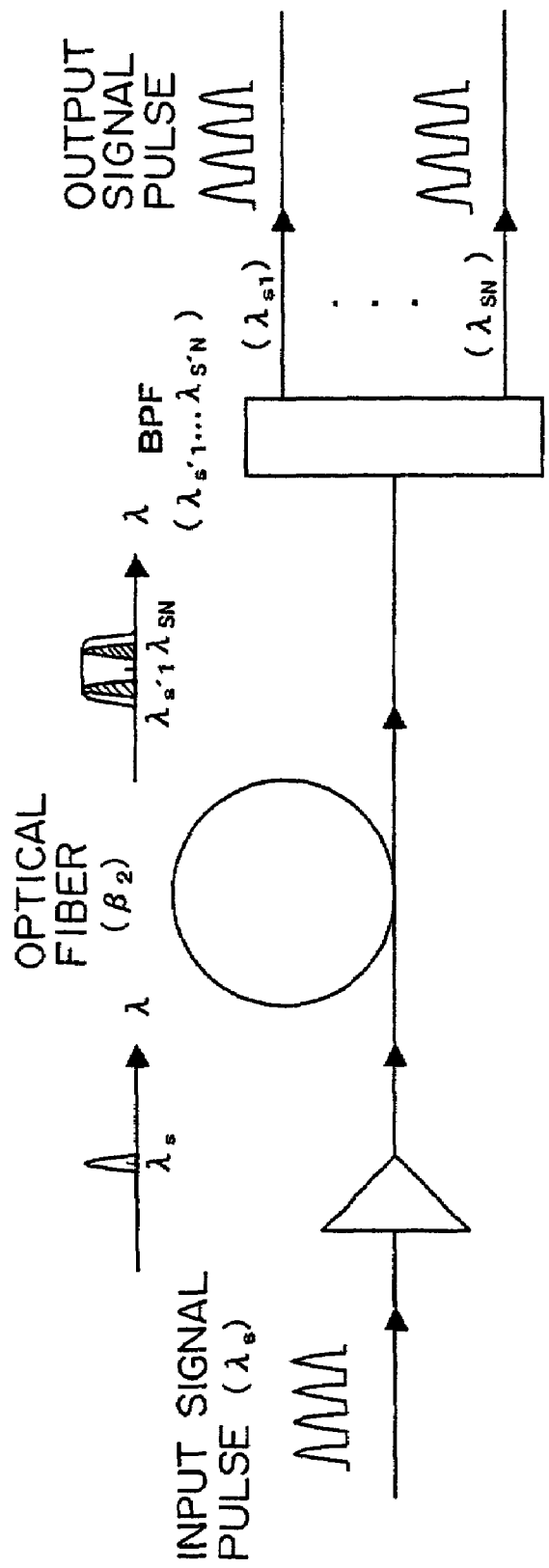
FIG. 5 shows the configuration of the fourth preferred embodiment of the present invention.

FIG. 5 shows the configuration of the fourth preferred embodiment of the present invention.

As in the generation of SC light in the basic configuration shown in FIG. 1, signal light is chirped by an optical fiber and the chirped signal light, that is, SC light, is passed through a multi-pass-band BPF with center wavelengths $\lambda_{s1}$ to $\lambda_{sN}$ and WDM signal pulses are outputted. In this case, since each of all the outputted signals has the same information as that of an input signal, signal distribution so-called multi-cast can be implemented. By doing so, the optical impulse with wavelength $\lambda_s$ of an input signal can be outputted as a plurality of signals each with one of wavelengths $\lambda_{s1}$ to $\lambda_{sN}$. Therefore, if signals are multi-cast and transmitted with different wavelengths, a plurality of optical signals can be easily generated. If signals are multi-cast at the same wavelength, the wavelengths of the optical pulses with each wavelength generated as described above can be converted by the method described in the basic configuration of the present invention. In this case, since the wavelengths of the optical signals can be converted although the signals are not converted into electrical signals, the optical signals can be multi-cast at the same wavelength without being converted into electrical signals.

For a multi-pass-band optical BPF, an AWG, an inter-leaver filter, a tandem-connected fiber grating or the like is used.

In the optical add circuit of the preferred embodiment described above, the addition timing of an optical pulse must be adjusted. For the timing adjustment configurations, a spacer type for mechanically finely adjusting the length, a type for finely adjusting the optical path length by applying stress to an optical fiber, a type for finely adjusting the optical path length of a waveguide by applying voltage to this waveguide or a type for finely adjusting group delay in a transmission medium by changing the temperature, etc., of the transmission medium is used.

For the optical drop circuit in the preferred embodiment described above, all circuits used for optically demultiplexing an OTDM signal are applicable, and (i) an optical/electrical (OE) conversion type, (ii) an optical modulator type, (iii) an optical gate with an interferometer configuration, and (iv) an optical wave mixer type can be used.

Of these, type (i) obtains a drop signal by converting an input signal into an electrical signal by a light receiver, extracting a desired timing factor in an electrical stage and optically modulating this signal again. Type (ii) extracts a desired timing signal component using an optical intensity modulator such as an EA modulator, LiNbO$_3$ or the like. For type (iii), a variety of gates, such as a Mach-Zehnder (MZ) interferometer, Michelson (MI) interferometer using non-linear phase modulation shift in a semiconductor, a non-linear optical loop mirror (NOLM), a loop mirror using a semiconductor optical amplifier(SLALOM), a ultra high-speed non-linear interferometer (UNI), etc., are used. For type (iv), a three wave mixer/difference frequency generator using a secondary non-linear medium, a four wave mixer using a third order non-linear medium and the like are used.

Although in the description of both the principle and configuration of the preferred embodiments, a third order non-linear effect is utilized, the third order non-linear effect generally means the followings. Specifically, the third order non-linear effect is an interaction, the generation efficiency of which depends on the product of two optical wave amplitudes, of interactions generated between three optical waves. This is generated in an optical fiber and a variety of crystals/semi-conductors, and it includes self-phase modulation (SPM), cross-phase modulation (XPM) and four-optical wave mixing (FWM). The supercontinuum (SC) used in the preferred embodiments of the present invention is also generated by the third order non-linear effect, in an optical fiber, photonic crystals, semiconductor materials and the like.

Although, of these, it is most popular to generate SC using an optical fiber, a semiconductor amplifier can also be used to reduce the size.

According to the present invention, both the wavelength conversion and all optical branching/addition of an OTDM signal can be implemented and the flexibility of a photonic network can be improved accordingly.

What is claimed is:

1. An optical pulse addition device for use in a demultiplexing/multiplexing of a plurality of time-division multiplexed optical signals in terms of time without converting the optical signals into a plurality of electrical signals, comprising:
   a chirp unit generating a frequency chirp in an inputted optical signal composed of a plurality of optical pulses and extending a spectrum of the optical pulse;
   a transmission unit transmitting a part of the extended spectrum through a band around a prescribed wavelength; and
   an addition unit adding an optical pulse corresponding to the transmitted band to a time-division multiplexed optical signal with the prescribed wavelength.

2. The optical pulse addition device according to claim 1, wherein said chirp unit is made of a third order non-linear medium.

3. The optical pulse addition device according to claim 2, wherein said third order non-linear medium is made of a semiconductor.

4. The optical pulse addition device according to claim 2, wherein said third order non-linear medium is made of an optical fiber.

5. The optical pulse addition device according to claim 4, wherein the optical fiber is a single-mode fiber, in which a non-linear refractive index of a core is set to a larger value than that of a normal single-mode fiber and the mode field diameter of which is reduced by performing control of both a specific refractive index difference between the core and a clading and a core diameter.

6. The optical pulse addition device according to claim 5, wherein the non-linear refractive index of the core in the fiber is obtained by doping $GeO_2$ to the core and doping fluorine to the clading.

7. The optical pulse addition device according to claim 4, wherein the optical fiber is a dispersion-flat fiber.

8. The optical pulse addition device according to claim 4, wherein the optical fiber is a holey fiber.

9. The optical pulse addition device according to claim 4, further comprising:
   an amplification unit amplifying a strength level of an optical pulse inputted to the optical fiber up to a level such that a prescribed chirp can be generated in the optical fiber.

10. The optical pulse addition device according to claim 1, further comprising
    an optical branching unit branching a part of a time-division multiplexed signal composed of optical pulses, wherein
    the part of the branched time-division multiplex signal is inputted to said chirp unit.

11. The optical pulse addition device according to claim 10, wherein a light intensity modulator, an interferometer type non-linear optical switch or a four-optical wave mixer is used for said optical branching unit.

12. The optical pulse addition device according to claim 1, wherein said transmission unit has a plurality of transmission bands.

13. An optical time-division multiplexed apparatus for use in a demultiplexing/multiplexing of a plurality of time-division multiplexed optical signals in terms of time without converting the optical signals into a plurality of electrical signals, comprising:
    a chirp unit generating a frequency chirp in an inputted optical signal composed of a plurality of optical pulses and extending a spectrum of the optical pulse;
    a transmission unit transmitting a part of the extended spectrum through a band around a prescribed wavelength; and
    an addition unit adding the optical pulse corresponding to the transmitted band to a time-division multiplexed optical signal with the prescribed wavelength.

14. The optical time-division multiplexed apparatus according to claim 13, which increases a multiplex degree of time-division multiplex signals by repeating processes of said chirp unit, transmission unit and addition unit.

* * * * *

UNITED STATES PATENT AND TRADEMARK OFFICE
CERTIFICATE OF CORRECTION

| | |
|---|---|
| PATENT NO. | : 7,136,596 B2 |
| APPLICATION NO. | : 10/014367 |
| DATED | : November 14, 2006 |
| INVENTOR(S) | : Shigeki Watanabe et al. |

It is certified that error appears in the above-identified patent and that said Letters Patent is hereby corrected as shown below:

Title Page, Column 2 (Abstract), Line 8 after "($\tau$)" insert --,--.

Column 8, Line 2, change "despersion -flat" to --despersion-flat--.

Column 8, Line 13, "comprising" insert --:--.

Signed and Sealed this

Fifteenth Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,136,596 B2 | Page 1 of 1 |
| APPLICATION NO. | : 10/014367 | |
| DATED | : November 14, 2006 | |
| INVENTOR(S) | : Shigeki Watanabe et al. | |

It is certified that error appears in the above-identified patent and that said Letters Patent is hereby corrected as shown below:

Title Page, Column 2 (Abstract), Line 8 after "($\tau$)" insert --,--.

Column 8, Line 2, change "dispersion -flat" to --dispersion-flat--.

Column 8, Line 13, "comprising" insert --:--.

This certificate supersedes Certificate of Correction issued May 15, 2007.

Signed and Sealed this

Seventh Day of August, 2007

JON W. DUDAS
*Director of the United States Patent and Trademark Office*